(12) United States Patent
Shier et al.

(10) Patent No.: US 7,810,103 B2
(45) Date of Patent: Oct. 5, 2010

(54) SYSTEM AND METHOD FOR VALIDATING COMMUNICATION SPECIFICATION CONFORMANCE BETWEEN A DEVICE DRIVER AND A HARDWARE DEVICE

(75) Inventors: Peter Shier, Seattle, WA (US); Patrick L. Garvan, Redmond, WA (US); Adrian Oney, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1922 days.

(21) Appl. No.: 10/836,735

(22) Filed: Apr. 30, 2004

(65) Prior Publication Data

US 2005/0246722 A1 Nov. 3, 2005

(51) Int. Cl.
G06F 9/46 (2006.01)
G06F 15/16 (2006.01)
(52) U.S. Cl. ........................ 719/321; 709/229
(58) Field of Classification Search ............... 719/321
See application file for complete search history.

(56) References Cited

U.S. PATENT DOCUMENTS 7,007,208 B1 * 2/2006 Hibbert et al. .............. 714/712
7,054,942 B1 * 5/2006 De La Bretoniere ........ 709/229
7,171,505 B2 * 1/2007 Kuhlmann et al. .......... 710/305
2002/0035638 A1 * 3/2002 Gendron et al. ............. 709/238
2002/0065950 A1 * 5/2002 Katz et al. .................. 709/318
2002/0152331 A1 * 10/2002 Wong et al. ................. 709/321
2002/0152456 A1 * 10/2002 Nightingale et al. ........ 717/135
2002/0161907 A1 * 10/2002 Moon ......................... 709/230
2003/0204612 A1 * 10/2003 Warren ....................... 709/230
2004/0176942 A1 * 9/2004 Chochia et al. ............... 703/22
2005/0015642 A1 * 1/2005 Hannel et al. .................. 714/4
2005/0015702 A1 1/2005 Shier et al.
2005/0251561 A1 * 11/2005 Hanes ......................... 709/217

* cited by examiner

Primary Examiner—Hyung S Sough
Assistant Examiner—Abdou K Seye
(74) Attorney, Agent, or Firm—Wolf, Greenfield & Sacks, P.C.

(57) ABSTRACT

A system and method for validating whether communications between a device driver and a hardware device conform to a communication specification is presented. A validation module obtains a communication specification identifying rules for validating whether communications between a device driver and a hardware device conform to the specification. A redirection module redirects communications between the device driver and the hardware device to the validation module. Based on an individual communication, as well as the context in which an individual communication is made, the validation module validates whether the communication conforms to the communication specification.

20 Claims, 3 Drawing Sheets

Fig.1.

(PRIOR ART)

SYSTEM AND METHOD FOR VALIDATING COMMUNICATION SPECIFICATION CONFORMANCE BETWEEN A DEVICE DRIVER AND A HARDWARE DEVICE

FIELD OF THE INVENTION

The present invention relates to computer hardware and software, and more particularly, to a system and method for validating communication specification conformance between a device driver and a hardware device.

BACKGROUND OF THE INVENTION

After connecting or installing a hardware device to a computer, there is a user expectation that the hardware device will work, i.e., that the computer will properly recognize, communicate and operate with the hardware device, and that through the computer, a user will be able to utilize that hardware device. Unfortunately, quite frequently, after a user has apparently connected or installed the hardware device to the computer, the computer and hardware device fail to communicate and/or inter-operate. In such circumstances, it is very difficult to determine the exact nature or source of the failure. For example, the failure may lie in an operating system problem, in faulty software for communicating with the hardware device, or in improper installation. In any event, the user is left to try to isolate the problem and rectify the situation.

Even after a hardware device is apparently installed and operating on a computer, it is not uncommon that the hardware device operates at less than its advertised or optimal performance, or that some features or aspects associated with the hardware device fail to operate entirely. Again, the user must determine whether the software that interfaces with the hardware device is faulty, whether the hardware device itself is faulty, whether the user incorrectly installed the device, or whether the operating system is at fault.

When faced with these problems, a user may refer to operator manuals for the hardware device and/or for the operating system, call a support service, check on the provider's Internet site, consult with user groups, and the like. However, a user is often unable to secure proper assistance because the user is unable to identify the exact source of the problem. As such, the user will frequently turn to the most visible and/or accessible information source, either an operating system provider or a hardware provider.

Operating system providers are a frequent, yet incorrect, target of dissatisfied users for various reasons, including the widespread use of the operating system, the fact that the operating system is a common denominator to the problem, and also, that the operating system provider often bundles device drivers for various hardware devices with its operating system, primarily for user convenience. For purposes of the present discussion, and as those skilled in the art will recognize, a device driver is a body of computer code that, when installed on a computer, acts as the interface for a specific hardware device for the operating system. In other words, device drivers represent the hardware/software interface between the operating system and the hardware device.

As one example of how operating system providers often bundle device drivers on deliverable media with their operating system, the distributable media for the most recent version of Microsoft Corporation's Windows® operating system includes bundled device drivers for approximately 10,000 different hardware devices! However, while an operating system provider, such as Microsoft Corporation, distributes or bundles numerous device drivers for user convenience, most device drivers are not actually written by the operating system provider. In fact, most device drivers are actually written by the corresponding hardware device provider, and submitted to the operating system provider for distribution purposes. This distribution mechanism also explains why hardware device providers offer updated device drivers: to correct "issues" with an earlier version of the device driver that was distributed by the operating system provider.

In spite of the fact that the operating system provider does not actually write the device drivers, because they distribute the device drivers, to a user it appears that the device drivers are "from" the operating system provider, and the dissatisfied user calls the operating system provider when a problem arises. Thus, it behooves an operating system provider to determine that a hardware device operates at a minimum level of compatibility with a computer running its operating system prior to bundling a device driver on its distribution media.

One area where the operating system provider looks to determine whether a hardware device (with its corresponding device driver) is compatible with a computer system is the communication between the hardware device and the device driver. Those skilled in the art will readily appreciate that in order for a hardware device to properly function on a computer system, the hardware device must communicate with the computing system, particularly with the operating system, according to some predetermined communication protocol. The device drivers, as the interface between the operating system and the hardware device, encapsulate this communication protocol. The communication protocol is almost always memorialized in a so-called communication specification.

The communication protocol may conform to a public communication specification, or alternatively, be implemented as a private communication specification. Examples of public communication specifications include the Universal Serial Bus (USB) specification and the IEEE 1394 specification (also referred to as Firewire). Private communication specifications are simply non-public communication protocols that are encapsulated in corresponding device drivers. Hybrid communication specifications, i.e., a combination of both public and private communication specifications, are also sometimes used. However, irrespective of whether a specification is a public or private communication specification, the communication protocol represented by the specification represents a set of rules by which a device driver and a hardware device should abide in order to properly communicate. Failure to follow those rules can result in computer system/hardware incompatibilities, reduced or failed hardware performance, irreparable damage to the hardware device's firmware, operating system failures, and the like.

Testing whether the communications between a device driver and a hardware device conform to an established specification is currently a difficult process. In addition to the sheer number of hardware devices available, according to current practices, in order to evaluate the communication between a device driver and a hardware device, one must locate and/or identify the communication stream as it flows between the device driver and the hardware device. Frequently, these communications may take place over system interrupts, register reads and writes, system port reads and writes, through shared memory blocks, and the like. One trying to locate the communications between a device driver and a hardware device must be well versed in monitoring a myriad of "events" occurring on a computer system, and filter out events and the like that are not related to the monitored communications. In addition to "merely" identifying the communications, in order to validate whether a device driver and hardware device communicate according to a communication specification, one must also evaluate the communications with respect to the rules established by communication specification. Clearly, determining, or validating, whether communications between a device driver and a hardware device conform to a specification is a complex task, often overlooked by operating system providers.

In an effort to address a more general task of determining whether a hardware device is compatible with a computer system, a system and method has been proposed to simulate or emulate an actual hardware device with software, and to provide an automated testing environment to determine the device's compatibility with the operating system. This system and method, set forth in commonly assigned and U.S. Pat. No. 7,181,382, entitled System and Method for Testing, Simulating, and Controlling Computer Software and Hardware, is incorporated herein by reference. According to this novel approach for determining whether a hardware device is compatible with a computer system, a particular hardware device is emulated in software. Communications from a device driver written for the hardware device are intercepted and may be redirected to the emulated hardware device. Similarly, the emulated hardware device responds with information as would an actual hardware device, and those communications are routed to the device driver.

While the above-incorporated reference includes a system that intercepts and redirects the communications between a device driver and a hardware device, it is not adapted to evaluate the communications themselves, and in particular, to determine whether the communications conform to a predetermined communication specification.

In light of the above-described issues relating to hardware compatibility with computing devices, and more particularly relating to validating whether a device driver and hardware device communicate according to an established specification, a need exists for a system and method for validating whether communications between a hardware device and a device driver conform to a specification. The present invention addresses these and other issues relating to the prior art.

SUMMARY OF THE INVENTION

In accordance with aspects of the present invention, a computer system for validating whether communications between a device driver and a hardware device conform to a predetermined communication specification is presented. The computer system includes a validation module that validates whether communications that occur between a device driver and a hardware device conform to the communication specification. The computer system also includes a redirection module. The redirection module intercepts communications that occur between the device driver and the hardware device and forwards them to the validation module for validating whether they conform to the communication specification.

In accordance with additional aspects of the present invention, a method, implemented on a computer system, for validating whether communications between a device driver and a hardware device conform to a communication specification is presented. A validation module obtains rules for validating whether communications between a device driver and a hardware device conform to a communication specification. The communications between the device driver and a hardware device are intercepted and redirected to the validation module. As communications occur between the device driver and the hardware device, each communication is examined with respect to the obtained rules to validate whether the communication conforms to the communication specification.

In accordance with yet further additional aspects of the present invention, a computer-readable medium bearing computer-executable instructions is presented. When the computer-executable instructions are executed, they carry out a method for validating whether communications between a device driver and a hardware device conform to a communication specification comprising the following steps. A validation module obtains rules for validating whether communications between a device driver and a hardware device conform to a communication specification. The communications between the device driver and a hardware device are intercepted and redirected to the validation module. As communications occur between the device driver and the hardware device, each communication is examined with respect to the obtained rules to validate whether the communication conforms to the communication specification.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While the present invention is described in terms of operating on a personal computer running an operating system, such as Microsoft Corporation's Windows® operating system, it should be appreciated that this is for illustration purposes only, and should not be construed as limiting upon the present invention. For example, the present invention may be suitably implemented on any number of computing devices, including personal computers, tablet computers, mini and mainframe computers, personal digital assistants (PDAs), and the like. Furthermore, while individual operating systems have specific implementation details for defining the software/hardware communication paradigm, the general principles described below, specifically a device driver communicating with a hardware device, are generally found in most operating systems, including UNIX, Linux and Apple® operating systems. As such, the present invention may be advantageously implemented on numerous operating systems.

Figure 1:
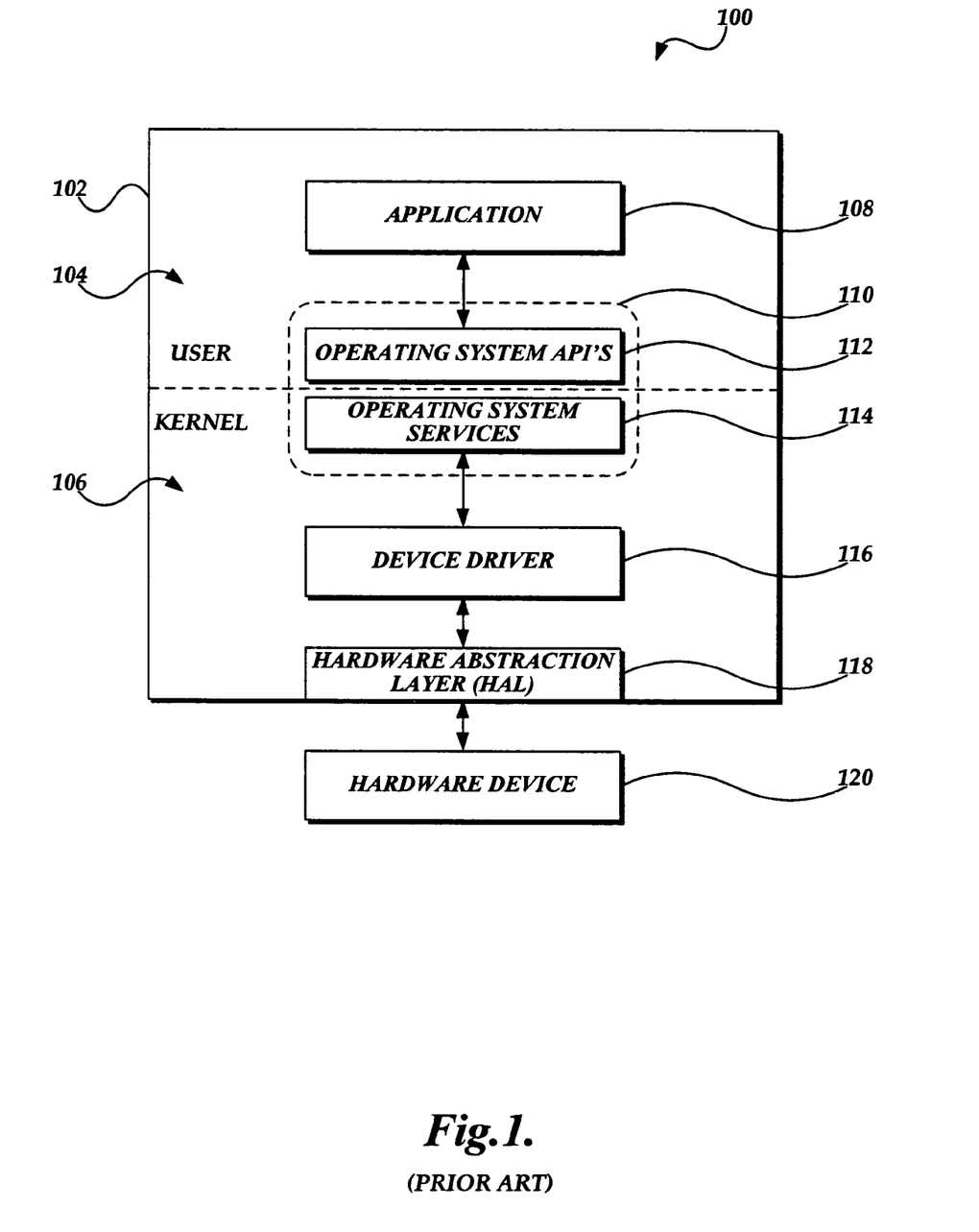
FIG. 1 is a block diagram illustrating exemplary components, including operating system components, installed on a computer system for illustrating how an application, operating in user mode, communicates with a hardware device via a device driver operating in kernel mode, as found in the prior art.

As mentioned above, FIG. 1 is a block diagram illustrating exemplary components, including operating system components, installed on a computer system for illustrating how an application, operating in user mode, communicates with a hardware device via a device driver operating in kernel mode, as found in the prior art. Those skilled in the art will appreciate that an operating system 102 has many modes in which software applications and/or program modules may execute. As shown in FIG. 1, the illustrated operating system 102 comprises two modes in which software applications may execute: a user mode 104, and a kernel mode 106. While the present discussion uses the term "application" to describe a collection of computer-executable instructions, it should be understood that "application" is a generic term to describe a collection of executable instructions, and is not directed to any particular collection of instructions. For example, an "application" may refer to an executable program installed on the computer, to an interpretable script, services, library modules, and the like.

Software applications operating in user mode, often referred to as user mode applications, operate in a less privileged area of the operating system. Examples of user mode applications include word processing programs, spreadsheets, games, e-mail readers, and the like. Most user mode applications gain access to operating system functions via a well defined, secure set of functions and programs, commonly referred to as operating system application programming interfaces (APIs). Alternatively, software applications that operate in the kernel mode 106, often referred to as kernel mode applications, have access to and operate in a more privileged area of the operating system. Device drivers, such as device driver 116, are one example of kernel mode applications.

Due to the distinct operating modes in an operating system, there are limits to the type of interaction that may occur between two components operating in the different modes. More particularly, in order for application 108, operating in user mode 104, to communicate with a hardware device 120 through a device driver 116 operating in the kernel address space 106, a special communication channel 110 is provided. This communication channel comprises a user mode portion and a kernel mode portion. As shown in FIG. 1, the user mode portion includes the operating system APIs 112. The operating system APIs 112 are specially designed to communicate with their kernel mode counterpart, operating system services 114. The operating system services 114, operating in kernel mode, are able to directly communicate with various kernel mode components, including device driver 116.

While the device driver 116 represents the software/hardware interface between the operating system and the hardware device, according to various operating system implementations, the device driver uses a generic, hardware abstraction layer (HAL) 118 for communicating with hardware devices, such as hardware device 120. The HAL 118 provides a standardized tool for device drivers to read and write information to and from the hardware device, but the device drivers, such as device driver 116, encapsulate the knowledge, such as the communication protocol, of how to use the HAL to carry out desired communications with a hardware device 120.

As an example of how the components of FIG. 1 operate together, assuming that hardware device 120 is a particular type of storage device, and further assuming that application 108 wishes to write data to the hardware device 120, the flow of information is as follows. Application 108 makes a call to one of the operating system APIs 112 to write some date to the hardware device 120. The called operating system APIs 112 communicate with the corresponding operating system services 114, operating in the kernel mode 106, for writing data to the hardware device 120. The operating system services 114 identify the appropriate device driver 116 associated with the hardware device 120 and forward the write request to the device driver. The device driver 116, according to its encapsulated communication protocol, issues commands to the hardware device 120 via the HAL 118. Status information, indicating the success or failure of the write, is likely returned to the application 108 through the components described above in their reverse order. Similarly, if the application 108 requests to read information from the hardware device 120, the application calls corresponding operating system APIs 112, which in turn issue read commands to the operating system services 114. The operating system services 114 forward the read request to the device driver 116, which reads the information from the hardware device 120 via the HAL 118. The read information is then returned from the device driver 116 to the operating system services 114, and returned to the application 108 as a response to the read request to the operating system APIs 112.

As previously mentioned, in the environment described above in regard to FIG. 1, it is very difficult to determine whether communications between the device driver 116 and the hardware device 120 conform to their predetermined specification, due, at least in part, to the difficulty in identifying the actual communications between the device driver and hardware device. The above mentioned reference, U.S. Pat. No. 7,181,382, entitled System and Method for Testing, Simulating, and Controlling Computer Software and Hardware, which is incorporated herein by reference, discloses, among other things, a novel approach for identifying and redirecting the communications between the device driver 116 and the hardware device 120. By utilizing the concept of intercepting and redirecting communications between a device driver 116 and a hardware device 120, irrespective of whether a HAL 118 is also present, the present invention is able to validate whether these communications conform to a predetermined communication specification.

Figure 2:
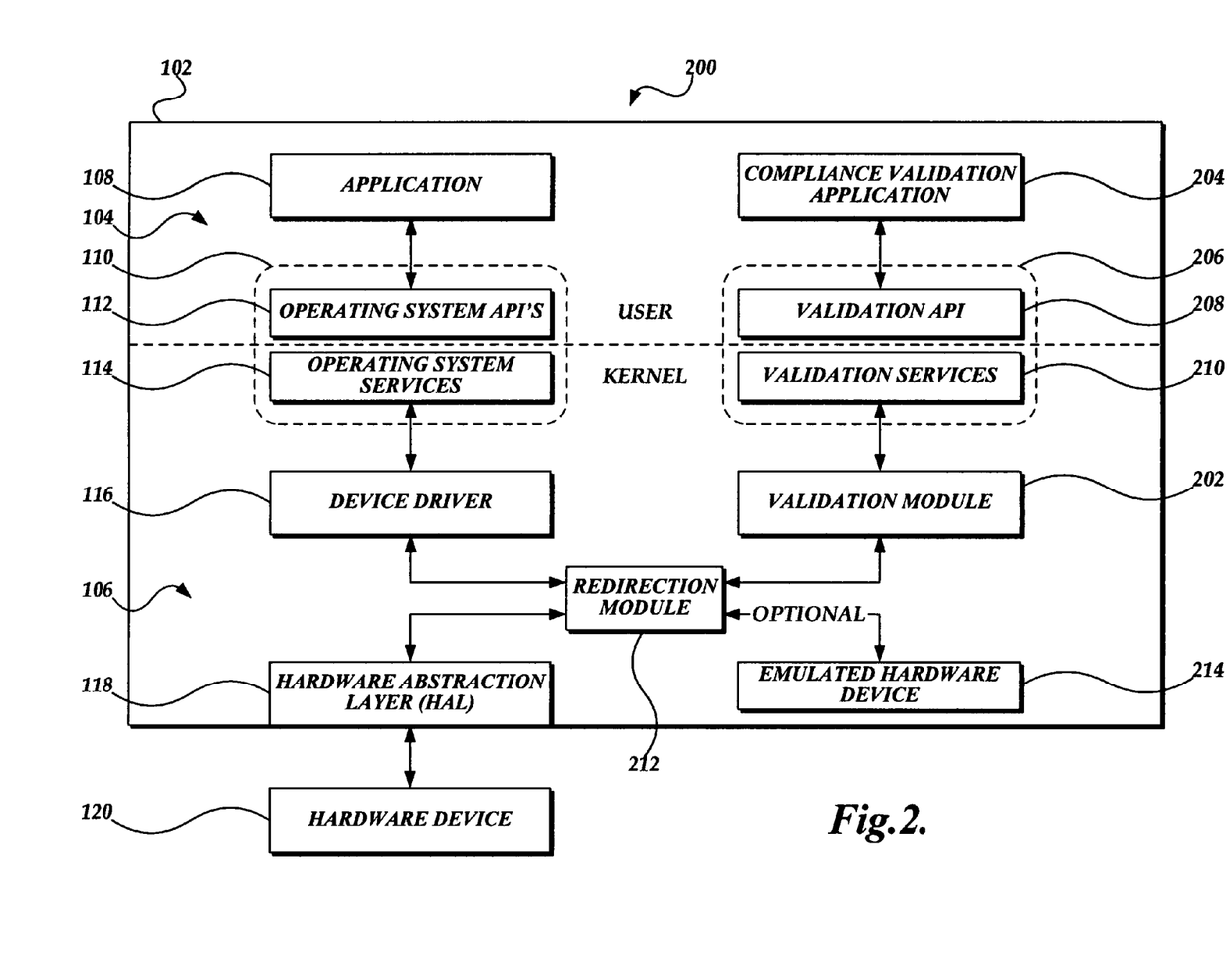
FIG. 2 is a block diagram illustrating exemplary components installed on a computer system for validating whether communications between a device driver and a hardware device conform to a communication specification.

FIG. 2 is a block diagram illustrating exemplary components, installed on computer system 200, for validating whether communications between a device driver 116 and a hardware device 120 conform to a communication specification, in accordance with aspects of the present invention. Similar to those components described above in regard to FIG. 1, the computer system 200 of FIG. 2 will typically include a user mode 104 and a kernel mode 106, operating system APIs 112 operating in the user mode, and corresponding operating system services 114 operating in the kernel mode. Also included in this exemplary set of components is the HAL 118, though in an alternative embodiment a HAL may not necessarily be present.

Unlike the components of FIG. 1, communications between a device driver 116 and the hardware device 120, irrespective of whether a HAL 118 is used, are redirected to/by a redirection module 212. More particularly, according to the present invention, the redirection module 212 intercepts communications between a device driver 116 and a corresponding hardware device 120. Upon intercepting a communication between the device driver 116 and hardware device 120, the redirection module 212 forwards the intercepted communication to a validation module 202. In addition to forwarding the intercepted/redirected communication to the validation module 202, the redirection module 212 completes the communication by forwarding the communication to its intended destination, i.e., either the device driver 116 or hardware device 120 via the HAL 118.

While the present discussion with regard to redirecting a communication between a device driver 116 and hardware device 120 would indicate that after the communication is intercepted it is first forwarded to the validation module 202, and subsequently, after the validation module 202 has completed its analysis of the communication, the communication is then forwarded to its intended destination (i.e., either the device driver or hardware device), it is to be viewed as illustrative only, and should not be construed as limiting upon the present invention. As one alternative to that described above, the redirection module 212 may first forward the communication to the intended destination and then forward a copy to the validation module 202. As another alternative, the redirection module 212 may simultaneously forward the intercepted communication to its intended destination and to the validation module 202. As yet another alternative, the redirection module 212 forwards the intercepted communication to the validation module 202 and only forwards the communication to the intended destination at the request of the validation module, thus giving control over the communications to the validation module. Accordingly, it should be appreciated that redirecting communications to the validation module 202 and forwarding the communications to their intended destination is not limited to any particular sequence of events or routes.

While FIG. 2 illustrates that only one redirection module 212 is used to intercept and redirect communications between a device driver 116 and a corresponding hardware device 120, according to an actual embodiment of the invention, a plurality of redirection modules 212 may be used in order to intercept and redirect the communications between the device driver and corresponding hardware device. As described above, communication between a device driver 116 and hardware device 120 may be effectuated in a variety of manners. Accordingly, a plurality of redirection modules may be used where each redirection module corresponds to a particular communication means available to the device driver 116 and hardware device 120. For example, one redirection module may intercept communications between the device driver 166 and hardware device 120 via reads and writes on the host computer system's ports, while another redirection module may intercept communications using reads and writes on the computer system's registers. Other redirection modules may correspond to communications delivered via computer system interrupts, shared memory access, direct memory access, and the like. Thus, while the present discussion of FIG. 2 is made in terms of a single redirection module 212, it should be viewed as illustrative, and not construed as limiting upon the present invention.

The validation module 202 evaluates the intercepted communications, received from the redirection module 212, to validate whether they conform to a predetermined communication specification. According to aspects of the present invention, the validation module 202 evaluates/validates individual communications as well as the context of the communications. For example, in regard to individual communications, the validation module 202 examines the format and/or content of the communication to determine whether it is formed according to the predetermined communication specification. In regard to the context of the communications, individual communications, especially response communications, are often constrained by communications that previously occurred. As an example to illustrate context/constraints, a communication specification may require that if a properly formed communication A is sent from the device driver 116 to the hardware device 120, then the hardware device must respond with a communication B, via the computer system's port C, having the third bit of the value at port C set to one, all within twenty milliseconds of receiving communication A. The validation module 202 is programmed to evaluate all of the rules, formats, and constraints associated with a particular communication specification.

The validation module 202 is preferably a generic validation tool. As a generic validation tool, the validation module 202 validates communications between any device driver and hardware device pair according to a supplied communication specification associated with the device driver/hardware device pair. In one embodiment, the validation module 202 receives the communication specification associated with the device driver/hardware device pair from a compliance validation application 204. According to aspects of the present invention, using the compliance validation application 204, a user is able to identify the targeted device driver/hardware device pair whose communications are to be evaluated, supply a communication specification to the validation module 212, as well as initiate and terminate the validation process. Upon termination of the validation process, the validation module 202 may generate a report reflecting the compliance level of the communications between the device driver 116 and the hardware device 120.

FIG. 2 illustrates that the compliance validation application 204 is operating in the user mode 104. Nevertheless, while the compliance validation application 204 may operate in the user mode 104, the present invention is not so limited. However, if the compliance validation application 204 is implemented as a user mode application, a communication channel 206 that bridges the user/kernel mode barrier may be necessary. As shown in FIG. 2, this communication channel 206 includes both a user mode portion, the validation APIs 208, and a kernel mode portion, the validation services 210. Thus, the compliance validation application 204 communicates with the validation APIs 208 as they both reside in user mode 104, the validation APIs 208 are specially written to communicate with the validation services 210, and the validation services are written to communicate with the validation module 202. The communication channel 206 is used because it is unlikely that the operating system APIs 112 include interface calls to deliver a communication specification to a validation module 202. In an actual embodiment, the validation APIs are implemented as a Microsoft Corporation's Component Object Model (COM) object, which technology is well known in the art.

In order for the validation module 202 to be a general purpose validation module, i.e., one that validates communications between a device driver 116 and a corresponding hardware device 120 according to a supplied communication specification, the requirements of a communication specification must be distilled into rules that can be validated by the validation module, and encoded in a specific format such that the validation module can parse the rules of the communication specification and interpret those rules in terms of the device driver/hardware device communications. The following table, Table A, represents a subset of rules that may correspond to a particular communication specification. For interpretation purposes, italicized letters in the following table, such as "n" and "m", represent numeric values, and value or words separated by a "/", such as "0/1" or "register/port", indicate a selection of one of the two tokens listed.

TABLE A

1 Rules for Register or Port Writes
   1.1 Data may have bit $n$ = 1/0
   1.2 Data cannot have bit $n$ = 1/0
   1.3 If bit $n$ = 1/0, the $m$ = 1/0
   1.4 If bit $n$ = 1/0, then bit $m$ = 1/0 in register/port $r$
   1.5 If bit $n$ = 1/0, then bit $m$ in register/port $r$ must be set to 1/0 within $x$ milliseconds
   1.6 Register/port $r$ must be read only
2 Rules for Shared Memory Writes TABLE A-continued 2.1 Data at offset $i$ may have bit $n$ = 1/0
2.2 Data at offset $i$ cannot have bit $n$ = 1/0
2.3 If bit $n$ = 1/0 of data at offset $i$, then $m$ = 1/0
2.4 If bit $n$ = 1/0 of data at offset $i$, then bit $m$ = 1/0 in register/port $r$
2.5 If bit $n$ = 1/0, then bit $m$ in register/port $r$ must be set to 1/0 within $x$ milliseconds
2.6 Data at offset $i$ must be read only
3 Rules for Resource Usage
  3.1 Device cannot use interrupts
  3.2 Device uses interrupt $I$
  3.3 Device cannot use ports
  3.4 Device uses port $p$
  3.5 Device cannot use registers
  3.6 Device uses register $R$ According to one embodiment of the present invention, the rules of a communication specification are encoded in an extensible markup language (XML) file according to an XML schema understood by the validation module 202 for delivery to the validation module. Tables B and C below illustrate segments of an XML file showing specific encoded rules. In particular, Table B illustrates a specific encoding of rule 1.2, and Table C illustrates a specific encoding of rule 2.5.

TABLE B

```
<RULE Name = "Rule00">
<!-- Register at offset 0x1234ABCD cannot have bit 3 set to 0 -->
    <TYPE>register</TYPE>
    <DATA>
        <OFFSET>1234ABCD</OFFSET>
        <DEPENDENCY>
            <TYPE>data</TYPE>
            <DEPDATA>
                <VALUE16>xxxxxxxxxxxx0xxx</VALUE16>
                <RELATION>false</RELATION>
            </DEPDATA>
        </DEPENDENCY>
    </DATA>
</RULE>
```

TABLE C

```
<RULE Name = "Rule04">
<!-- If register at offset 0x1234ABCD has bit 5 set to 1, then bit 3 of
     port at offset 0xABCD1234 must be set to 0 within 100
     milliseconds
-->
    <TYPE>register</TYPE>
    <DATA>
        <DIRECTION>write</DIRECTION>
        <OFFSET>1234ABCD</OFFSET>
        <VALUE16>xxxxxxxxxx1xxxxx</VALUE16>
        <DEPENDENCY>
            <TYPE>timing</TYPE>
            <DEPTIMING>
                <TYPE>port</TYPE>
                <OFFSET>ABCD1234</OFFSET>
                <VALUE16>xxxxxxxxxxxx0xxx</VALUE16>
                <TIME>100<TIME>
                <RELATION>true</RELATION>
            </DEPTIME>
        </DEPENDENCY>
    </DATA>
</RULE>
```

While the compliance validation application 204 typically delivers the communication specification to the validation module 202 and initiates the validation process, the compliance validation application does not necessarily drive the communications between the device driver 116 and the hardware device 120. The compliance validation application 204 could drive the communications between the device driver 116 and hardware device 120, either by making calls on the operating system APIs 112 that would cause communications between the device driver and hardware device to occur, or by initiating the communications via directive delivered through the validation module 202 to the device driver via the redirection module 212. Preferably, however, a separate application for driving the communications is used. For example, application 108 could be a test application used to initiate communications between the device driver 116 and the hardware device 120.

It should be noted that while the present invention has been discussed in regard to validating communications between a device driver 116 and a hardware device 120, according to an alternative embodiment, the present invention may alternatively be used to validate communications between a device driver and an emulated hardware device, such as emulated hardware device 214, rather than an actual hardware device. Additionally, while FIG. 2 illustrates that the exemplary device driver 116 resides in kernel mode 106, it is illustrative only and should not be construed as limiting upon the present invention. Still further, the present invention may be used to validate communications between a device driver and a non-emulated device, i.e., a "device" that is implemented simply as a software device. For example, a voice over IP (VoIP) connection is frequently treated as a "device" by a computer system, yet is implemented on the computer system entirely in software and is not an emulation of an actual hardware device.

Figure 3:
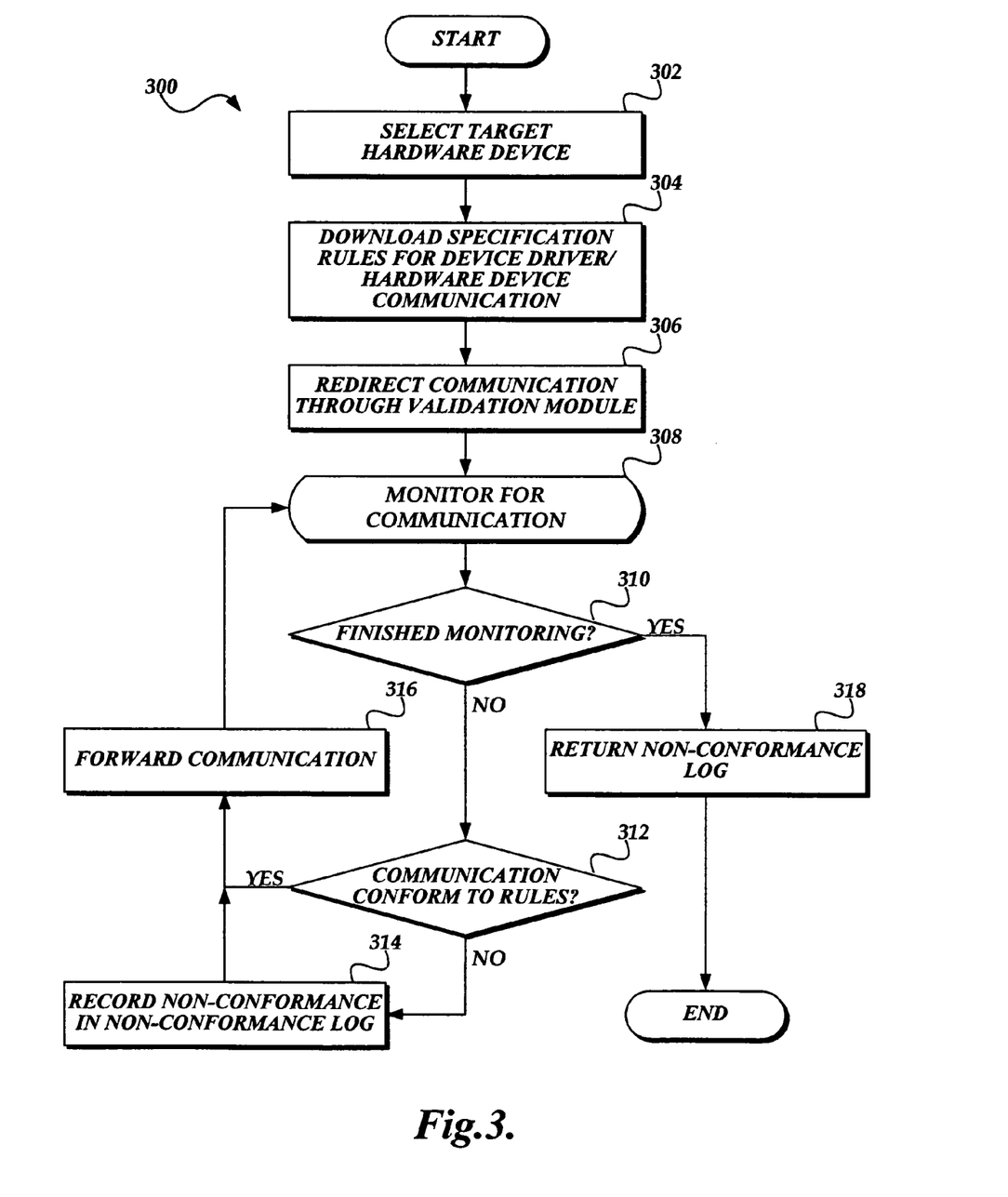
FIG. 3 is a flow diagram illustrating an exemplary routine, implemented on a computing system, such as the system described in regard to FIG. 2, for validating whether the communications between a device driver and a hardware device conform to a communication specification.

FIG. 3 is a flow diagram illustrating an exemplary routine 300, implemented on a computing system, such as the computing system 200 described in regard to FIG. 2, for validating whether the communications between a device driver 116 and a hardware device 120 conform to a communication specification. Beginning at block 302, a target hardware device 120, with its corresponding device driver 116, is selected for validating whether they communicate according to a communication specification. At block 304, the communication specification's rules for validating whether communications between a device driver 116 and hardware device 120 are downloaded to the validation module 202. At block 306, at least one redirection module 212 is initiated to redirect the communications between the device driver 116 and hardware device 120 through the validation module 202.

At delay block 308, after having initialized the redirection module 212, the routine 300 monitors for communications between the device driver 116 and hardware device 120. Additionally at delay block 308, the routine 300 monitors for an indication that the exemplary validation routine is to terminate. Thus, after detecting either a communication or an indication to terminate, at decision block 310, a determination is made as to whether the routine 300 is to terminate validating the communications between the device driver 116 and hardware device 120. If there was not an indication that the routine 300 is to terminate, at decision block 312, another determination is made as to whether the detected communication conforms to the communication specification previously downloaded to the validation module 202.

If the communication does not conform to the communication specification, at block 314 a record of the non-conformance is made. Thereafter, or if the communication conforms to the communication specification, at block 316, the communication is forwarded to its intended destination, i.e., either the device driver 116 or the hardware device 120. After forwarding the communication to its intended destination, the routine 300 returns again to delay block 308 awaiting subsequent communications or an indication to terminate.

The routine 300 continues to validate the communications between the device driver and hardware device 120 until, at decision block 310, it is determined that an indication to terminate was received. Thereafter, at block 318, the exemplary routine 300 reports the non-conformance log and then terminates.

While various embodiments of the present invention have been illustrated and described, including the preferred embodiment, it will be appreciated that various changes can be made therein without departing from the spirit and scope of the invention.

The embodiments of the invention in which an exclusive property or privilege is claimed are defined as follows:

1. A computer system, comprising:
   at least one storage device, storing data and/or instructions defining:
      a communication specification having encoded therein at least one rule defined by a communication protocol;
      a validation module that validates communications that occur between a device driver and a hardware device by determining whether at least a portion of the communications conform to the communication specification, the determining comprising evaluating each one of the at least a portion of the communications with respect to a previous communication to determine whether the at least a portion of the communications conform to the communication protocol; and
      a redirection module that intercepts communications that occur between the device driver and the hardware device and forwards them to the validation module for validation; and
      a compliance validation application, the validation module obtaining the communication specification from the compliance validation application;
   wherein:
   the compliance validation application operates in user mode; and
   the computer system further comprises a validation communication channel including a user mode portion and a kernel mode portion, wherein the compliance validation application delivers the communication specification to the user mode portion, the user mode portion delivers the communication specification to the kernel mode portion, and the kernel mode portion delivers the communication specification to the validation module.

2. The computer system of claim 1, wherein the computer system is running an operating system having a user mode and a kernel mode, and wherein the device driver and the redirection module operate in the kernel mode.

3. The computer system of claim 2, wherein the validation module operates in the kernel mode.

4. The computer system of claim 2, wherein the operating system running on the computer system is a Microsoft Corporation Windows operating system.

5. The computer system of claim 1, wherein the communication specification is encoded in an XML file.

6. The computer system of claim 1, wherein the user mode portion of the validation communication channel is implemented as a COM object.

7. The computer system of claim 1, wherein the validation module forwards the redirected communication to its intended destination via the redirection module.

8. A method, implemented on a computer system, for validating whether communications between a device driver and a hardware device conform to a communication protocol, the method comprising:
   redirecting the communications between the device driver and the hardware device to a validation module; and
   as communications occur between the device driver and the hardware device, examining, at the validation module, at least a portion of the communications with respect to rules for the communication protocol encoded in a communication specification, the examining comprising evaluating each one of the at least a portion of the communications with respect to a previous communication to validate whether the at least a portion of the communications conforms to the communication protocol;
wherein:
the computer system executes an operating system having a user mode and a kernel mode in which processes operate, and wherein the device driver and the validation module operate in the kernel mode;
the validation module obtains the rules for the communication protocol from a compliance validation application operating in the operating system's user mode;
the rules encoded in the communication specification are encoded in an XML file; and
the validation module, operating in kernel mode, obtains the rules from the compliance validation application, operating in user mode, via a communication channel having a both user mode and kernel mode portion wherein the compliance validation application is able to communicate with the user mode portion and the validation module is able to communicate with the kernel mode portion.

9. The method of claim 8, further comprising forwarding the redirected communications to their intended destination.

10. The method of claim 8, wherein the user mode portion of the communication channel is a COM object.

11. The method of claim 10, wherein the operating system is a Microsoft Corporation Windows operating system.

12. The method of claim 11 further comprising reporting to the compliance validation application whether the communications between the device driver and hardware device conform to the communication specification.

13. The method of claim 8, wherein examining each communication with respect to the rules to validate whether the communication conforms to the communication protocol comprises examining the communication to determine if it is properly formed.

14. The method of claim 8, wherein examining each communication with respect to the rules to validate whether the communication conforms to the communication protocol comprises examining a communication with respect to a subsequent communication.

15. A non-transitory computer-readable medium having recorded thereon computer-executable instructions which, when executed on a computer system, carry out a method for validating whether communications between a device driver and a hardware device conform to a communication protocol, the method comprising:
   redirecting the communications between the device driver and the hardware device to a validation module; and
   as communications occur between the device driver and the hardware device, examining at least a portion of the communications with respect to rules for the communication protocol encoded in a communication specification, the examining comprising evaluating each one of the at least a portion of the communications with respect to a previous communication to validate whether the at least a portion of the communications conforms to the communication protocol;

wherein the method further comprises:

obtaining, at the validation module, the rules for validating whether communications between the device driver and the hardware device conform to the communication protocol; and forwarding the redirected communications to their intended destination;

and wherein:

the computer system is running an operating system having a user mode and a kernel mode in which processes operate, and wherein the device driver and the validation module operate in the kernel mode;

the validation module obtains the rules for validating whether communications between the device driver and the hardware device conform to a communication protocol from a compliance validation application operating in the operating system's user mode;

the rules encoded in the communication specification are encoded in an XML file; and the validation module, operating in kernel mode, obtains the rules from the compliance validation application, operating in user mode, via a communication channel having a both user mode and kernel mode portion wherein the compliance validation application is able to communicate with the user mode portion and the validation module is able to communicate with the kernel mode portion.

16. The non-transitory computer-readable medium of claim 15, wherein the user mode portion of the communication channel is a COM object.

17. The non-transitory computer-readable medium of claim 16, wherein the operating system is a Microsoft Corporation Windows operating system.

18. The non-transitory computer-readable medium of claim 16 further comprising reporting to the compliance validation application whether the communications between the device driver and hardware device conform to the communication protocol.

19. The non-transitory computer-readable medium of claim 15, wherein examining each communication with respect to the rules to validate whether the communication conforms to the communication protocol comprises examining the communication to determine if it is properly formed.

20. The non-transitory computer-readable medium of claim 15, wherein examining each communication with respect to the rules to validate whether the communication conforms to the communication protocol comprises examining a communication with respect to a subsequent communication.

* * * * *